United States Patent [19]

Gromek et al.

[11] Patent Number: 4,549,779
[45] Date of Patent: Oct. 29, 1985

[54] TWO-PART HANDLE ASSEMBLY FOR ELECTRICAL APPLIANCE

[75] Inventors: Francis S. Gromek, Linden; William F. Haines, Sr., Sea Bright, both of N.J.

[73] Assignee: New Regina Corporation, Rahway, N.J.

[21] Appl. No.: 461,785

[22] Filed: Jan. 28, 1983

[51] Int. Cl.⁴ .......................................... H01R 13/639
[52] U.S. Cl. ................................ 339/58; 339/184 R; 339/75 R; 16/110.5
[58] Field of Search .................... 339/58, 75 R, 217 S, 339/75 M, 184 R; 16/110.5, 115, 116 R, DIG. 12, DIG. 15, DIG. 24, DIG. 30, DIG. 18, DIG. 19, DIG. 41

[56] References Cited

U.S. PATENT DOCUMENTS

| 1,124,684 | 1/1915 | Allen | 55/376 |
|---|---|---|---|
| 1,270,303 | 6/1918 | Kuhn et al. | 339/58 |
| 1,947,136 | 2/1934 | Moorhead | 15/328 |
| 2,148,599 | 2/1939 | Becker | 339/92 R |
| 2,221,746 | 11/1940 | Kirby | 15/351 |
| 2,724,093 | 10/1952 | Preston | 339/75 M |
| 3,244,437 | 4/1966 | Belicka et al. | 285/7 |
| 3,407,373 | 10/1968 | Brown et al. | 339/5 R |
| 3,599,168 | 8/1971 | Long | 339/58 |
| 3,609,637 | 9/1971 | Cole | 339/75 R |
| 4,247,216 | 1/1981 | Pansini | 16/DIG. 41 |

FOREIGN PATENT DOCUMENTS 2940107 4/1981 Fed. Rep. of Germany .
1564201 4/1969 France .

Primary Examiner—Gil Weidenfeld
Assistant Examiner—Thomas M. Kline
Attorney, Agent, or Firm—Martin LuKacher

[57] ABSTRACT

In order to provide a more compact package for economical storage and shipment, of a vacuum cleaner, or the like, the handle is manufactured in two portions. The two portions are configured to fit together in a predetermined manner with a telescoping relationship and to concomitantly complete electrical connections through connectors which are affixed to and internal to respective handle portions. At least one of the electrical connectors is allowed some longitudinal and rotational motion relative to its handle portion to facilitate electrical connector engagement and alignment. The assembly is held together by a fastener passing through the telescoped handle portions and one of the connectors. A portion of one of the connector assemblies also serves to limit the excursion of a compression spring surrounding a portion of the associated handle portion.

3 Claims, 16 Drawing Figures

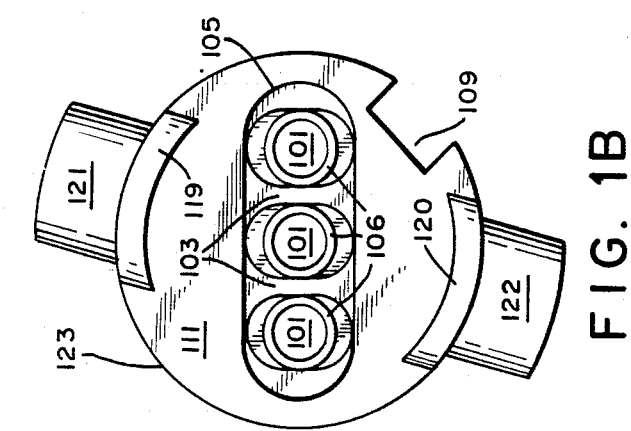
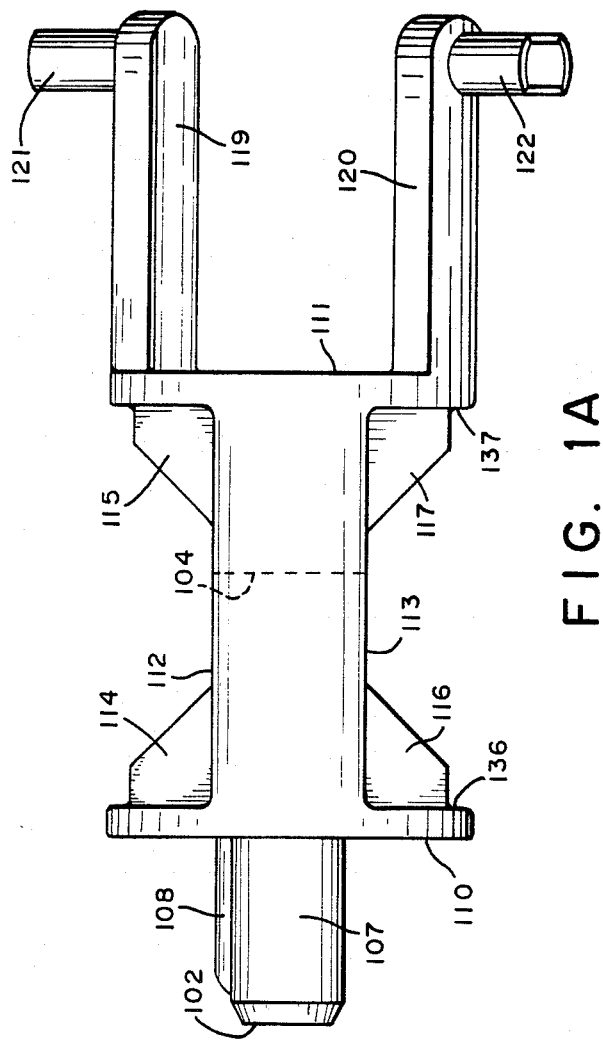
FIG. 1B
FIG. 1A

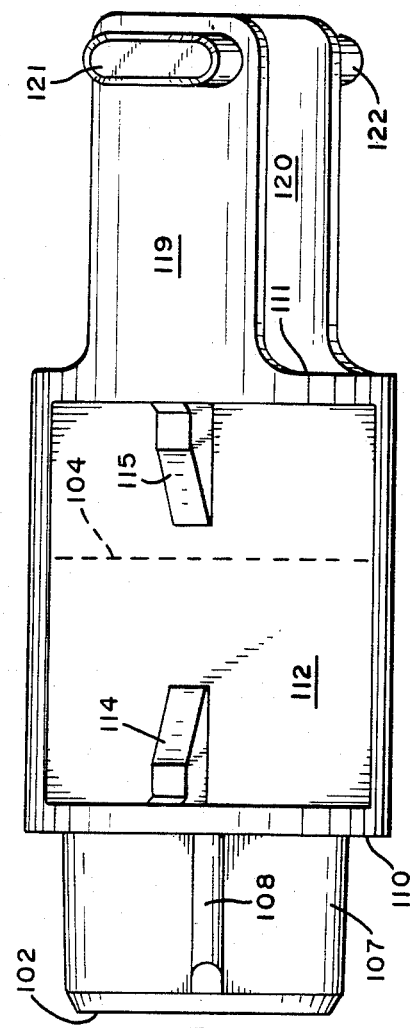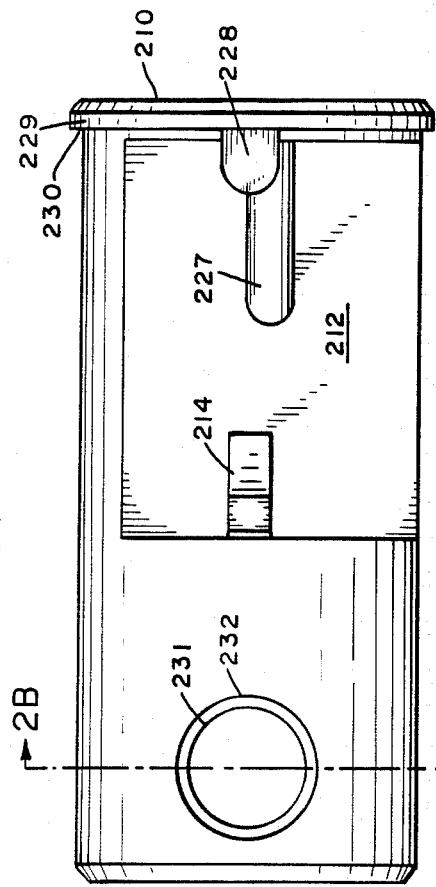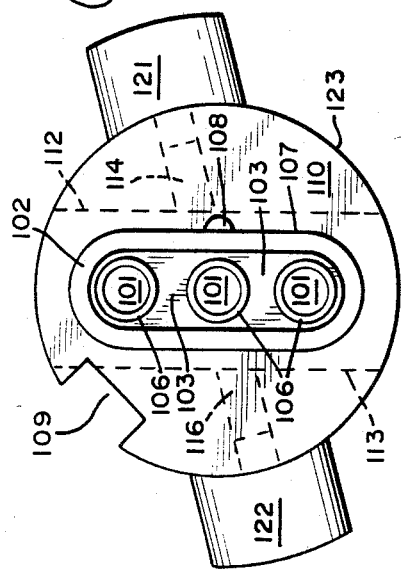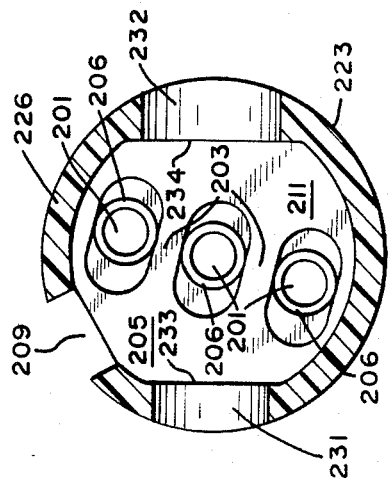

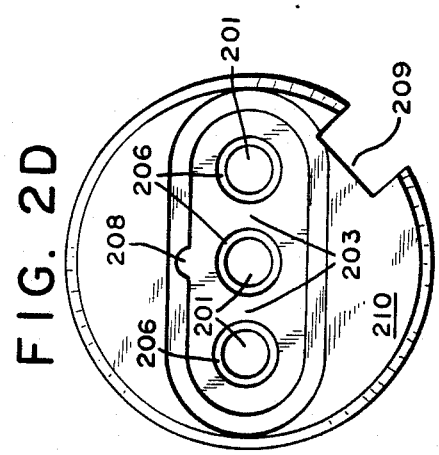
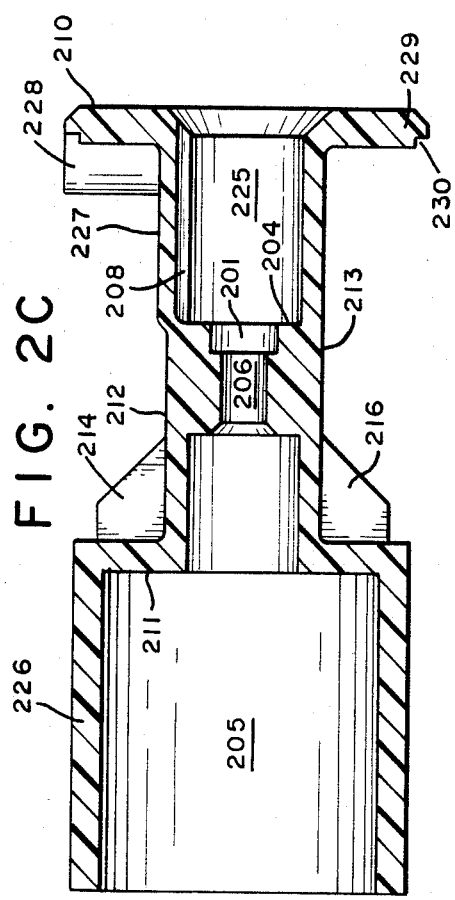
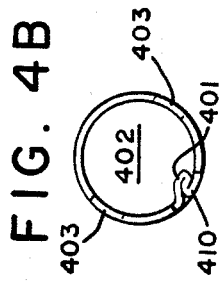
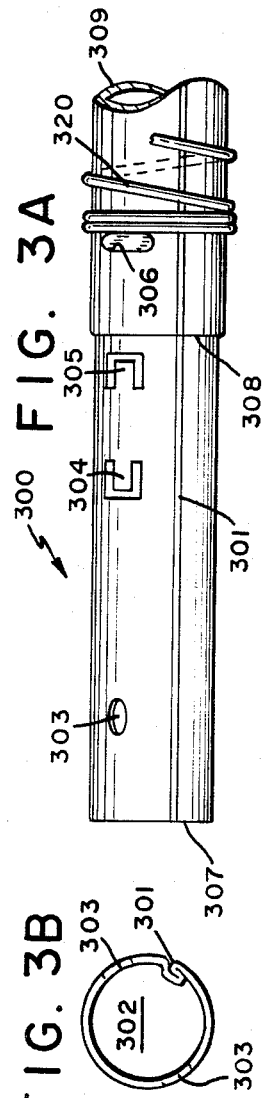
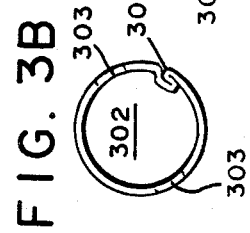
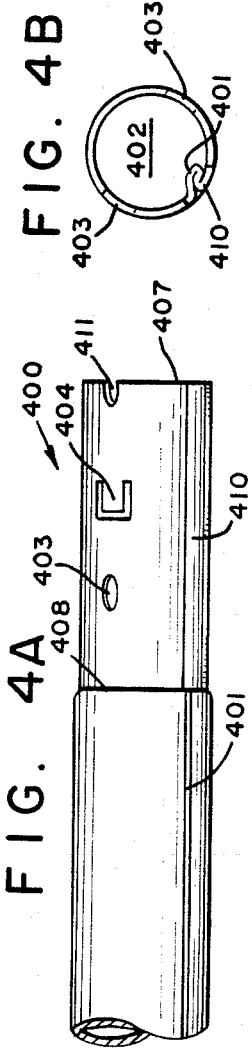

TWO-PART HANDLE ASSEMBLY FOR ELECTRICAL APPLIANCE

BACKGROUND OF THE INVENTION

This invention relates to electrical devices and, more particularly, to an operating and/or control handle for such devices through which electric control wires pass.

A variety of electrical devices are fabricated with a longitudinal handle which comprises a plurality of parts and which has one part thereof adjacent to an electrical motor and another party terminating in a hand grip. Typically, the handle portions are hollow and electrical controls in the form of switches are located in the hand grip and wires extend to the lower end of the handle where they are electrically coupled to a motor. A typical example is a floor care product, such as a vacuum cleaner, a floor polisher or a floor sanding machine or the like. In addition, the invention may be used in connection with lawn mowers, lawn edgers or any other type of equipment which may be conveniently and expeditiously controlled and operated by means of a handle. Although the present description will refer to the use of the invention in a vacuum cleaner environment, it should be understood that the invention may be utilized with any of the other devices mentioned as well as others.

Sometimes, the operating handles are made of a plurality of members in order to permit adjustment of handle lengths in order to maximize convenience and efficiency as the device is used by users of different stature. However, in this particular case, the handle is made of a plurality of members in order to facilitate packing, transporting and displaying the packaged product. With modern merchandising techniques, it has become necessary for products to be packaged within containers whose maximum dimension does not exceed a predetermined figure. In order to accommodate the packaging requirements for devices of the character described, it was expedient to fabricate the handle in two portions and require them to be assembled when the product is removed from the package. Modern requirements concerning product safety and protection of the consumer from electrical shock, posed several problems in connection with the design of a suitable handle.

DESCRIPTION OF THE PRIOR ART

The prior art discloses a wide variety of handles which have multiparts which are selectively coupled together. Some of these have electrical wires passing therethrough and some provide various connecting means for connecting the wires from one part of the handle to the wires of the other part of the handle.

U.S. Pat. No. 1,124,684 issued to G. W. Allen on Jan. 12, 1915 discloses an early example of a separable handle together with an electrical connector. This handle and connection certainly served the desired purpose but would not meet today's UL requirements for safety and it is relatively bulky, expensive, and difficult to manufacture.

U.S. Pat. No. 1,140,992 issued to E. A. Martin on May 25, 1915 discloses a multipart vacuum cleaner handle wherein the electrical connections between two components thereof are made external to the handle member.

U.S. Pat. No. 1,806,461 issued to H. W. Holmes on May 19, 1931. This patent discloses a plug assembly that is internal of the hollow member handle and requires manually assembling the electrical connection and subsequent thereto completing the manual connection of the handle. This assembly serves its intended purpose but would not pass the rigid safety requirements of this day and age and is a more complex and time consuming product to assemble.

U.S. Pat. No. 1,947,136 issued to A. E. Moorhead on Feb. 13, 1934 discloses another handle assembly and electrical connection technique which served the purpose in its time, but which today, would be considered awkward, expensive and unsafe.

U.S. Pat. No. 1,993,471 issued to G. W. Allen on Mar. 5, 1935 discloses an improvement of his earlier cited patent. However, it still does not disclose a technique which is as simple, convenient, and safe as that disclosed in connection with the present invention.

U.S. Pat. No. 2,148,599 issued to B. C. Becker on Feb. 28, 1939 discloses another form of electrical connection contained within a hollow handle. This handle does not include the convenient, economical and safe electrical connection to be described in the following specification.

U.S. Pat. No. 2,221,746 issued to J. B. Kirby on Nov. 12, 1940 also discloses an early and simple electrical connector disclosed within a hollow handle.

U.S. Pat. No. 2,660,457 issued A. H. Mallon on Nov. 24, 1953 discloses a telescopic handle but no electrical connection therethrough is included.

U.S. Pat. No. 3,177,460 issued to D. F. Downey on Apr. 6, 1965 discloses an electrical connection which is exterior of a hollow member.

U.S. Pat. No. 3,200,432 issued to D. H. Voegeli, et al discloses a hollow handle comprising a portion of the suction path and made of telescoping elements. This handle does not include an electrical connection.

U.S. Pat. No. 3,213,481 issued to F. K. Minerley on Oct. 26, 1965 discloses a hollow handle with an electrical connection passing therethrough but does not include specific details concerning the electrical connection.

U.S. Pat. No. 3,217,351 issued to F. P. Hayba on Nov. 16, 1965 discloses a vacuum cleaner which appears to include a two-section handle with an electrical wire passing therethrough. However, no details concerning the assembly of the handle nor the electrical connection therethrough is included.

U.S. Pat. No. 3,244,437 to M. E. Belicka, et al on Apr. 5, 1966 discloses a telescoping handle which may be adjusted to various lengths but no electrical connection is included therewith.

U.S. Pat. No. 3,350,858 issued to E. L. Verhagen on Nov. 7, 1967 discloses a handle which appears to be made of multiple parts and to include a wire through the interior thereof. There is no disclosure to show how the connection between the various handle components is made nor to show how electrical connections are conducted therethrough.

U.S. Pat. No. 3,534,317 issued to R. Descarries, et al on Oct. 13, 1970 discloses a rather sophisticated hollow tubular handle including electrical connections and providing for relative longitudinal motion between two elements of the handle. The electrical conduction technique comprises conducting strips and spring contact members affixed to the exterior of the handle.

U.S. Pat. No. 3,879,573 issued to S. J. Ehrlich on Apr. 22, 1975 discloses a considerably more sophisticated handle mechanism that neither teaches nor suggests an electrical connection technique having any characteristics in common with this invention.

SUMMARY OF THE INVENTION

The present invention provides a longitudinal hollow handle for use with an electrical appliance, such as a vacuum cleaner, which comprises separable handle portions in order to provide a more compact package to facilitate shipping and merchandising display. Although the consumer could disassemble the handle for storage purposes, it is contemplated that in the usual application, the handle will remain in its assembled condition subsequent to initial consumer assembly. The handle and electrical connectors are convenient and economical to fabricate using modern manufacturing techniques. In addition, the electrical connectors satisfy all applicable requirements for consumer and electrical safety.

The handle comprises two hollow tubular members, each fabricated of sheet metal and including a bent or formed longitudinal joint or seam. At the junction of the two handled portions, one is necked down so that a portion thereof has an outer diameter which fits snuggly within the inner diameter of the mating handle portion with the seam serving as an alignment key. One handle portion includes an insulating pin member which terminates a plurality of electrical conductors and which is secured in the handle member by means of detents formed in the handle member. The mating handle member includes an insulating socket with corresponding electrical connections and this member is also secured to the handle member by detents formed in the handle member. In addition, and as part of the socket member, a spring wing portion through openings in the handle to serve as limit means for limiting the longitudinal motion, in one direction, of one end of a compression spring surrounding the exterior of the associated handle portion. The spring also serves to bias the socket member towards the limit of limited longitudinal motion. The pin and socket are keyed into their respective handle portions making use of the joining seam of the handle so that proper alignment of the contacts is assured as the handle members are joined. In order to assure proper electrical alignment when all manufacturing tolerances are considered, at least one of the pin or socket is arranged for slight rotational and/or longitudinal motion within its associated handle member. Subsequent to assembly of the handle portion, fastening means is passed through aligned holes in the overlapped handle portions and one of the pin or socket members. In order to assure that the fastening means passing through the aligned holes will not interfere with the electrical conductors, a sleeve is used. The assembly satisfies all safety requirements of such organization as the Underwriters Laboratory (UL).

It is the general object of the invention to provide a new and improved multipart appliance handle with electrical connectors.

It is another object of the invention to provide a handle of the character described which is economical and efficient in its manufacture and which is convenient and safe in use.

It is a more specific object of the invention to provide a telescoping handle connection which can only be assembled in a predetermined manner and which, when so assembled, will complete a plurality of electrical connections.

It is another object of the invention to provide an assembly of the character described in which it would be virtually impossible to get an electrical shock if the handle is assembled or disassembled with electrical power applied thereto.

It is another object of the invention to provide an assembly which, under current safety requirements, does not require double insulation on the wire.

It is another object of the invention to provide an assembly wherein a portion of one of the insulating electrical connection members may include a spring wing member and an associated tab which projects through openings in the handle for limiting the longitudinal motion in one direction of one end of a compression spring which surrounds the exterior of the associated handle.

It is yet another object of the invention to use the mentioned compression spring for biasing the associated insulating electrical connection member towards one limit of limited longitudinal motion with respect to the associated handle member.

Still another object of the present invention is to provide a new and improved multipart handle for an electric appliance which substantially overcomes the disadvantages of the described prior art construction and which provides a structure characterized by its reliability, ruggedness, ease and convenience of use, simplicity and low cost.

BRIEF DESCRIPTION OF THE DRAWING

To permit an incisive and detailed analysis of the characteristics and features of this invention, a variety of figures have been drawn to illustrate the details of the various parts. It should be observed that they are not all drawn to the same scale. The drawing discloses a preferred embodiment of the invention and is not meant, in any way, to delimit its scope, but rather to aid in an understanding of the functions and features.

FIGS. 1A and 1B, together with FIGS. 1C and 1D comprise various views of a socket member;

FIGS. 2A and 2B, together with FIGS. 2C and 2D comprise various views of a pin member;

FIGS. 3A and 3B comprise a side and end view, respectively, of an upper handle assembly and into which the socket of FIGS. 1A through 1D is inserted;

FIGS. 4A and 4B comprise a side and end view, respectively, of a lower handle assembly into which the pin number of FIGS. 2A through 2D is inserted;

A given element is identified with the same number in all views.

DESCRIPTION OF THE PREFERRED EMBODIMENT

The two-part handle assembly described herein may be used on any of a variety of electrical appliances or products which conventionally requires the use of an operating or control handle. Typical appliances include floor and lawn care products. For convenience, the handle will be described in connection with a vacuum cleaner appliance.

Figure 6:
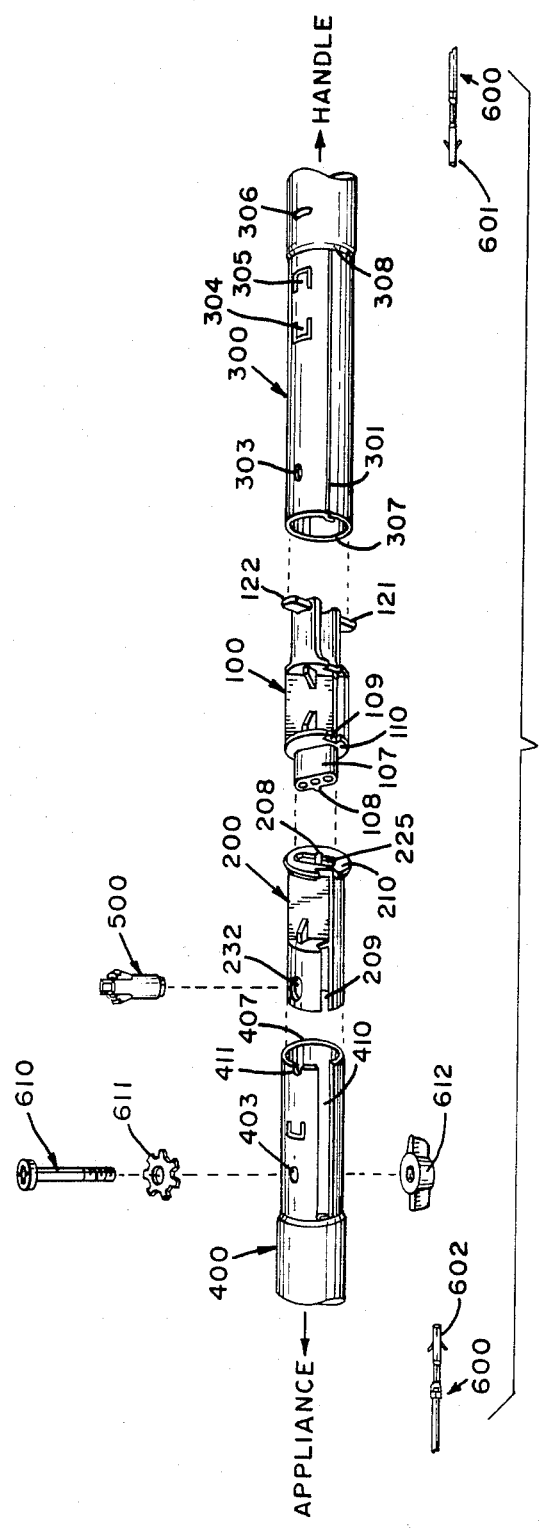
FIG. 6 comprises an exploded view of the various components shown in the other figures.

An exploded view of the essential parts of the handle is illustrated in FIG. 6 which includes the lower handle assembly indicated generally as 400; the insulating pin indicated generally as 200; the insulating socket indicated generally as 100 and the upper handle assembly indicated generally as 300. In addition, a sleeve 500 and a bolt 610 are illustrated. It should be understood that the sleeve 500 is assembled together with the pin 200 and inserted in the hollow interior of the lower handle assembly 400. In like manner, the socket 100 is assembled within the hollow interior of the upper handle 300. The inside diameter of the left-hand end of the upper handle 300 is no less than the outside diameter of the portion of the lower handle surrounding the pin 200 associated therewith. Accordingly, with the socket 100 and pin 200 associated with their respective handle portions, the upper handle portion 300 may be oriented, in a manner to be explained more fully hereinbelow, and engaged with the lower handle 400 in a telescoping manner. When properly oriented and engaged, a hole 303 in the upper handle is aligned with a corresponding hole 403 in the lower handle and these are in turn aligned with the sleeve 500 thereby allowing a bolt 610 to be passed through the sleeve 500 to secure the assembly.

The various components of the assembly will now be described in more complete detail in connection with the FIGS. 1A through 5C. Corresponding elements will be given the same identification number in all views and as a mnemonic aid, the first digit of the identifying number will indicate the principal figure number in which the element is illustrated. In other words, all elements which are part of the socket will have identifying numbers starting with 1; all numbers identifying parts of the pin will have identifying numbers starting with 2; elements associated with the lower and upper handle will have identifying numbers starting with 4 and 3, respectively.

Figure 5A:
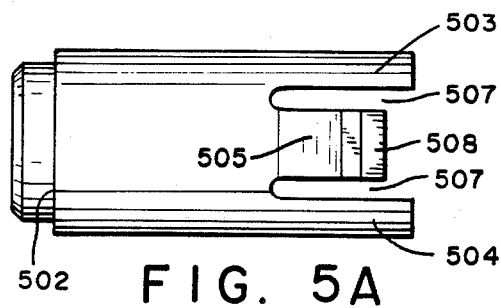
FIGS. 5A, 5B and 5C comprise different views of a sleeve member which cooperatively functions with the pin member of FIGS. 2A through 2D.
Figure 5B:
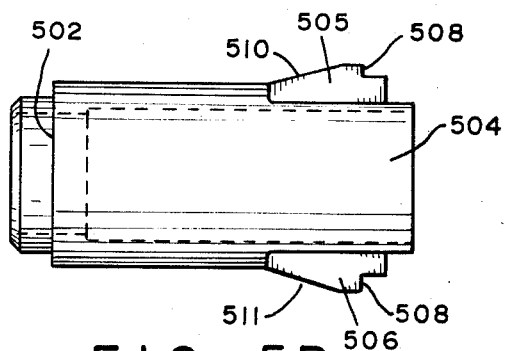
Figure 5C:
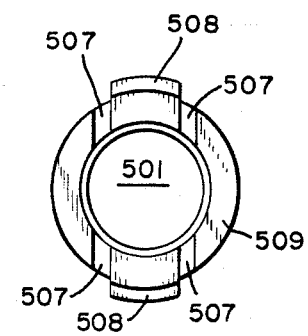

Considering now more specifically the other figures of the drawing, it should be understood that they are not all drawn to the same scale. FIGS. 1A through 2D are dawn to substantially the same scale, while FIGS. 3A through 4B are drawn in the same scale with respect to each other but on a reduced scale with respect to FIGS. 1A through 2D. FIGS. 5A through 5C are drawn on an even larger scale than FIGS. 1A through 2D.

Considering now more specifically FIGS. 1A through 1D, it should be understood that these figures illustrate different views of the socket indicated generally as 100 in FIG. 6. FIG. 1B comprises an end-view from the right-hand end of the socket 100 as shown in FIG. 1A. FIG. 1C comprises a view of FIG. 1A rotated 90 degrees about its longitudinal axis and FIG. 1D comprises a view from the left-hand end of FIG. 1C.

The pin 200, the socket 100 and the sleeve 500 may preferably be molded from an electrical insulating material which is of a generally rigid nature, but not brittle. Those familiar with available and suitable materials will have numerous possible products come to mind. One suitable substance is manufactured by The DuPont Company and sold under the tradename XYTEL and/or NYLON. It should be understood that a principal function of the socket 100 is to secure one or more wires 600 and associated terminal 601 for mating with a similar wire secured by the pin 200. To this end, the socket 100 includes a plurality of holes 101 shown in end view in FIGS. 1B and 1D. These holes are fabricated to cooperatively function with a wire termination so that when the wire terminal 601, with the associated wire 600, is inserted into the hole 101, it will be secured thereby in any of a variety of well-known manners which are widely used for securing or anchoring wire terminals. The wire terminals would be inserted into the holes 101 as viewed in FIG. 1B. The front end of the wire terminal would be proximate to the end 102 of the socket 100. The holes 101 have separating walls or septums 103. The holes 101 penetrate from the end 102 to an interior wall 104. To the right of the interior wall 104, the septums 103 are terminated and there is a single enlarged cavity 105 (FIG. 1B). Each of the holes 101 will be seen to include a central necked-down portion 106 which cooperates with the wire terminal to inhibit excessive insertion and to prohibit withdrawal of the terminal without the aid of a special tool. Such techniques are widely used in the industry and well understood by those acquainted with devices of this character.

As will be seen later, the socket 100 will mate with the pin 200 with the member 107 fitting into a mating recess in the pin 200. Formed on the member 107 is a key 108 which, as will be seen, mates with a keyway in the pin 200 to assure proper polarity and orientation. The surface 110 limits the penetration of the member 107 into the pin 200.

As will be seen subsequently, the upper and lower handle portions 300 and 400 are fabricated of sheet steel and have a formed folded joint, or seam. The joint creates a discontinuity in the otherwise circular interior of the handle members and to permit insertion of the socket member 100 within the upper handle member 300, a notch 109 is formed on the socket 100.

The upper surface 110 and a lower surface 111 are cylindrical except for the notch 109 in each of these surfaces. Intermediate of these surfaces, the body member includes flats 112 and 113. Formed on these flats will be found webs 114-117. These webs 114-117 will serve a function to be described more fully hereinafter. Briefly, they serve as limits for tangs which are bent inward from the handle 300 for limiting the longitudinal motion of the socket 100 relative to the upper handle 300.

Suspended from the lower surface 111 are the legs 119 and 120. Formed on the legs 119 and 120 are projections 121 and 122, respectively. These legs and projections serve a function to be described more fully hereinafter in connection with the description of the upper handle member 300.

Considering now the pin 200 which mounts within the lower handle assembly 400, the pin is illustrated in various views in FIGS. 2A, 2B, 2C and 2D. FIG. 2A comprises a side view of the pin 200 and FIG. 2B is a cross-sectional line taken on the line 2B—2B. FIG. 2C comprises a view of the pin 2A rotated 90 degrees and shown in cross-section. FIG. 2D comprises an end-view of the pin 200 as it would be seen from the right-hand end of FIG. 2C if FIG. 2C were not a cross-sectional view.

The pin 200 includes holes 201 which are substantially identical to, and serve the same function as, the holes 101 of the socket 100. The holes 201 are separated by septums 203. An interior wall 204 defines the interior end of an enlarged cavity 225 into which the member 107 is inserted in a manner to be described more fully hereinafter. There is also an enlarged cavity 205 at the left end of the pin as viewed in FIG. 2C. The holes 201 include a necked-down portion 206 which serve a function identical to that of the necked-down portion 106 of the socket 100. Within the enlarged cavity 225 is a keyway 208 which mates with the key 108 when the parts are assembled in the manner to be described more fully hereinafter. The pin 200 includes a notch 209 which serves the same function as the notch 109 of the socket 100. As may be perceived by viewing FIG. 2D and the notch 209, it will be understood that the notch 209 extends the entire length of the pin 200. Or, more accurately stated, the wall 226 which has a substantially circular exterior has a discontinuity 209 which functions as a notch. The pin 200 includes surfaces 210 and 211 with surface 210 comprising the end limit of the pin 200 and 211 comprising the right-hand end of the cavity 205. The pin 200 includes flats 212 and 213 generally correpsonding with the flats 112 and 113 of the socket 100. In like manner, the pin 200 includes webs 214 and 216. The pin 200 does not include webs which correspond with webs 115 and 117 of the socket 100.

In order to maintain substantially uniform wall thickness and provide for the keyway 208, there is a raised surface 227. In order to orient the pin 200 with respect to a notch in the lower handle 400, there is a key 228.

As will be explained more fully hereinafter, the pin 200 is not entirely recessed within the lower handle 400 and the front end 229 remains external with respect to the lower handle 400. That is, the sheet metal of the lower handle 400 fits into the shoulder 230.

Piercing the wall 226 is a pair of diametrically opposed holes 231 and 232. It should be observed that the wall 226 does not have an interior circular configuration but includes flats 233 and 234 associated with the holes 231 and 232, respectively. These will serve a function in connection with the use and insertion of the sleeve 500.

It should be observed that insofar as possible, elements of the pin 200 which have corresponding components in the socket 100 have been given identifying numbers which correspond except for their first digit. Accordingly, additional information may be obtained concerning these common elements and functions by making reference to the corresponding elements in the pin 200 and socket 100.

Considering now more specifically FIGS. 3A and 3B, it will be seen that they illustrate a portion of an upper handle assembly indicated generally as 300. The upper handle portion is fabricated of sheet metal with the edges folded to form a seam 301. As may be most clearly seen in FIG. 3B, the seam 301 prevents the interior 302 from having a fully circular cross-section. As previously indicated, the socket member 100 is to be recessed within the upper handle portion 300 and it is because of the seam 301 that the socket member 100 includes a notch 109. Indeed, it is the seam 301 and the notch 109 which cooperate together and allow insertion of the socket with a predetermined orientation. Except for the discontinuity of the seam 301, the upper handle member 300 has an interior diameter which is no smaller than the diameter of the circumference 123 of the socket 100 as seen in FIGS. 1B and 1D.

The handle portion 300 also includes a pair of diametrically opposed holes 303 which will serve a function to be described more fully hereinafter. In addition, the handle member 300 includes a pair of tangs, tabs or detents 304 and 305 which are formed by piercing the sheet metal of the handle 300. In addition to the tangs 304 and 305 as seen in FIG. 3A, there are companion tangs (not shown) in diametrically opposed positions. The handle 300 includes another hole 306 and a diametrically opposed companion hole (not shown). The portion of the handle 300 between the end 307 and an intermediate point 308 must have an inside diameter with a relationship to the socket 100 as previously described. In addition, this portion of the handle must have an outside diameter which will bear a specific relationship to a portion of the lower handle assembly to be described hereinafter. The portion of the handle assembly 300 illustrated to the right of the intermediate point 308 in FIG. 3A does not have a critical inside or outside diameter.

To start the assembly of the upper handle portion 300 with the socket 100, the wires 600 with associated terminals 601 are first inserted into the holes 101 of the socket 100 and secured therein by means of detents on the terminal 601 coacting with the surfaces forming the necked-down portion 106 all in a manner which is widely used and well-known in the industry. Subsequent to this association of the wires 600 and terminals 601 with the socket 100, the wires are threaded into the interior 302 of the handle assembly 300 until the projections 121 and 122 near the end 307 of the handle 300. At this time, the legs 119 and 120 are urged towards each other by an application of pressure until the projections 121 and 122 will fit within the interior 302 of the handle 300. Concomitantly with this action, the socket 100 is oriented so that as the socket is pressed further into the handle 300, the notch 109 will align with the seam 301. The socket 100 is pushed into the handle 300 until such time as the projections 121 and 122 align with the holes 306 and spring outward causing the projections 121 and 122 to engage with the hole 306 and the diametrically opposed companion hole (not shown). In order to further secure the socket 100 within the handle member 300, the tangs 304 and 305 together with their diametrically opposed tangs are bent inward. An examination of the parts as shown in the various figures will show that the tangs 304 and 305 will engage with the webs 116 and 117 and more specifically, engage with the corners 136 and 137. In an analogous manner, the diametrically opposed tangs will engage with corresponding corners associated with the webs 114 and 115.

Nominally, the projections 121 and 122 might be considered as securing the socket in its proper orientation with respect to the handle 300. However, in order to provide additional security and to comply with certain requirements concerning safety, the tang members and cooperating corners are provided as described. It will be seen that the tang member 304 cooperating with the corner 136 will inhibit insertion of the socket 100 any further into the handle 300 in the event the projections 121 and 122 are depressed and disengaged from the holes 306. In like manner, the tang 305, which engages with the corner 137 will inhibit the removal of the socket member 100 if the projections 121 and 122 are disengaged from the boundaries of the holes 306.

In assemblies of this character, it is not unusual to have manufacturing tolerances accumulate in a manner which causes minor misalignment and minor loss of full engagement of parts. In order to compensate for such possible minor misalignment, it should be understood that the slots 306 are somewhat elongated in both directions and that the notch 109 is slightly wider than the seam 301. Accordingly, it is possible for the socket 100 to have slight rotational motion about its longitudinal axis and slight longitudinal motion with respect to the handle 300. This will help assure engagement of the socket 100 with the pin 200 in the manner to be described more fully hereinbelow.

As may be perceived, from a consideration of the various figures, the projections 121 and 122 have a height which is greater than the thickness of the sheet metal from which the handle portion 300 is fabricated. As a result, these projections 121 and 122 will project beyond the cylindrical surface 309 of the handle. The projections 121 and 122 which project through the hole 306 and beyond the surface 309 serve to provide a stop for a compression spring 320. The compression spring 320 in turn provides pressure to maintain contact between surfaces 110 and 210 thereby assuring full contact engagement. The compression spring 320 also serves to help secure a filter bag when the assembly is used in connection with a particular type of vacuum cleaner. Since the filter bag does not comprise a part of this invention, it is not disclosed more fully herein. However, it may be of interest that in such assembly, the essential elements shown in FIGS. 1A through 5C will all be contained within the interior of the filter bag when assembly is complete.

Considering now FIGS. 4A and 4B comprising the lower handle assembly 400, it will be seen that it has many components and characteristics in common with the upper handle assembly. Thus, the lower handle assembly includes a seam 401, an interior 402, a hole 403 and an unseen diametrically opposed hole. The lower handle assembly includes only a single tang pair 404. As with the upper handle assembly, that portion between the end 407 and the intermediate point 408 must have carefully controlled inside and outside diameters.

The inside diameter between the end 407 and the intermediate point 408 must be no smaller than that necessary to accommodate the circumference 223 as seen in FIG. 2B.

As may be perceived, the lower handle assembly will be inserted into the interior of the upper handle assembly. As will be perceived, the seam 301 in the upper handle assembly might be expected to interfere with the seam 401 of the lower handle assembly. To overcome this difficulty, this seam 401 between the end 407 and the intermediate point 408 has been cut out to form an elongated notch 410.

Considering now the assembly and association of the pin 200 with the lower handle assembly 400, it should be understood that wires 600 and associated terminals 602 are inserted into the holes 201 in substantially the same manner as described with respect to the terminals 601 and the holes 101. The terminals 601 and 602 are, of course, configured for an ultimate mating relationship. Subsequent to the placement of the terminals 602 within the holes 201, the sleeve 500 illustrated in FIGS. 5A through 5C is inserted through the hole 232 in the pin 200. The sleeve 500 will be seen to be a hollow cylindrical member having a through passage 501, a shoulder area 502, legs 503 and 504, and spring members 505 and 506. The legs 503 and 504 are separated from the spring members 505 and 506 by slots 507. The spring members 505 and 506 include shoulders 508. It should be understood that the sleeve 500 is drawn to an enlarged scale as compared with the pin 200. The sleeve 500 has a circumference 509 which is no greater than that of the hole 231. In a similar manner, the reduced diameter portion of the sleeve to the left of the shoulder 502 has a diameter no greater than that of the hole 232. Accordingly, the sleeve 500 may be inserted into the hole 231, subsequent to the placement of the wires and associated terminals 602 in the holes 201. The sleeve 500 may be pressed into the hole until the shoulder 502 engages with the flat 233. As the sleeve 500 is inserted through the hole 232, the spring members 505 and 506 will be cammed inward by the cam surfaces 510 and 511 and concomitantly with the engagement of the shoulder 502 with the flat 233, the spring members will spring outward and the shoulders 508 will engage with the flat 234. As will be seen hereinafter, the sleeve 500 provides a passageway for a bolt 610 and assures non-interference of the bolt 610 with the wires connected to the pin 200.

With the wires and sleeve associated with the pin 200 in the manner described the wires will be inserted into the opening 402 of the lower handle assembly and the pin 200 brought proximate to the end 407. At this time, it should be recalled that the portion of the lower handle assembly has had the seam 401 removed between the end 407 and the intermediate point 408 in order to form a notch or slot 410. Accordingly, the notch 209 of the pin is not used for assuring proper relative orientation between the pin 200 and the handle assembly 400. The required orientation is obtained by engagement of the key 228 of the pin 200 with the mating keyway 411. When this association is obtained, the notch 209 will align with the slot 410. The notch or shoulder 230 engages with the end 407 of the lower handle assembly so that the front end 229 of the pin remains external to the lower handle assembly. The front end 229 has an outer diameter which is substantially the same as the outer diameter of the lower handle assembly intermediate of the end 407 and the point 408.

In a commercial product made in accordance with the teachings of this invention. It was possible to minimize tooling costs by using the same punch and die to fabricate the hole 403, the tang 404 and the keyway 411 together with diametrically opposed counterparts. This resulted in the production of an unnecessary keyway which is not shown in the drawing. This requires that during manufacturing assembly, the pin 200 be assembled so that the notch 209 is in alignment with the slot 410. Because of the extra keyway, it would be physically possible to position the pin 180 degress away from its required location. However, if improperly assembled, the notch 209 and slot 410 will not be in alignment and further assembly is impossible.

In summary, and as part of the manufacturing operation, the wires are properly associated with the pin and socket and the sleeve 500 is assembled together with the pin. The pin and socket are then associated with their respective handle portions in the manner described more fully hereinabove, and when so assembled, the passageway 501 through the sleeve 500 is in alignment with the hole 403. FIG. 6 illustrates the various components in an exploded view and in alignment for assembly.

It is contemplated that in the usual situation, the product will be packaged, shipped, and with the product still in its carton, displayed on distributor shelves without any further assembly and that subsequent to purchase, the consumer will complete the assembly in the manner to be described more fully hereinbelow.

As explained previously, an advantage of the invention is that an electrical appliance which requires a long handle for convenient and efficient operation thereof, is provided with a joint in order that the total package may have a reduced maximum dimension and thereby permit more efficient and convenient shipping and/or display. As a consequence, it is necessary for the consumer to complete the final stage of assembly subsequent to purchase. In order to protect the consumer against the possibility of electrical shock during assembly, the product has been designed to comply with all known regulations and requirements and to provide an assembly wherein it is virtually impossible for the consumer to obtain an electrical shock during assembly, even if any of several things singally, or in combination, are done improperly and/or incorrectly.

The proper procedure for the consumer to assemble the two-handle portions requires that the seam 301 of the upper handle portion be aligned with the slot 410 of the lower handle portion and the lower handle portion then inserted into the interior of the upper handle portion. This will result in the seam 301 passing through the notch 209 and the slot 410 and will cause the member 107 to be aligned with the enlarged cavity 225. As previously suggested, if there is any minor misalignment of mating components, the socket 100 does have slight rotational and/or longitudinal motion with respect to the handle assembly 300. With the member 107 inserted into the cavity 225, the electrical contacts which are positioned in the holes 101 and have their end positions near the left end 102 will mate with the contacts that were positioned in holes 201 and which have their electrical terminus proximate to but below the surface 210. The keyway 208 and 108 serve to further assure a proper mating relationship. It should be observed that the socket 100 and the pin 200 have a male-female relationship, respectively. However, the contacts 602 within the pin 100 and the contacts 601 within the socket 200 have a male-female relationship, respectively.

It is contemplated that the source of electrical energy will be connected to the wires that are terminated in the socket 100. Accordingly, even if one should plug in the appliance prior to completion of the assembly of the handle portions, it would be virtually impossible for one to obtain an electrical shock as the socket member is at some depth within the handle portion 300. Furthermore, the electrical terminals 601 are recessed in the member 107 below the end surface 102. It might be physically possible for the consumer to make finger contact with the electrical terminals 602 which are slightly below the surface 210. However, if these contacts are physically visible, there is no way that any electrical energy can be applied thereto and therefore, physical contact therewith does not present a hazard.

After the consumer has joined the two-handle portions together to effect the mating of the pins and sockets, and thereby complete the electrical connections, the holes 303 in the upper handle assembly are in alignment with the holes 403 in the lower handle assembly, and the sleeve 500 is in place secured within the holes 231 and 232 of the pin 200, and the bolt 610 may be passed through all these aligned holes without any danger of interference with the wires. Normally, the bolt 610 will include a lock washer 611 and be secured by a wing nut 612 or a nut and lock washer combination, not shown. The lock washers, if used, may be captive lock washers to assure they are not misplaced. It should be understood that it is contemplated that this is normally a one-time consumer assembly job and that once the product is assembled, it is maintained in that condition.

Depending upon the nature of the electrical appliance with which the components of the described assembly is used, further assembly may be required. For example, as alluded to hereinabove, when the assembly is used together with a certain type of lightweight vacuum cleaner, a filter bag may surround the portion of the handle assembly including the elements shown in the drawing. In such case, the spring 320, illustrated in FIG. 3A may be used to help hold the filter bag in its desired position and to provide some relative motion of a portion thereof.

While there has been shown and described what is considered at present to be the preferred embodiment of the invention, modifications thereto will readily occur to those skilled in the related arts. For example, the pin member could be provided with legs and projections similar to those used on the socket member and/or these elements could be omitted from the socket member if not required for cooperation with other elements. Also, if handles with seamless tubing are used, it will be understood that the tangs or other means could be employed to assure the required relative orientation of the parts. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described and it is intended to cover in the appended claims all such modifications as fall within the true spirit and scope of the invention.

What is claimed is:

1. A longitudinal hollow handle for an electrical appliance and comprising in cooperative combination:
    (a) first and second handle portions configured for limited and polarized telescoping engagement;
    (b) first and second electrical connectors associated with and interior of said first and second handle portions, respectively, for completing an electrical connection therebetween when said first and second handle portions are positioned in said polarized telescoping engagement;
    (c) first means for locking said first electrical connector within said first handle portion with a first predetermined and polarized orientation with respect thereto so that only limited relative rotational and/or longitudinal motion therebetween is possible;
    (d) second means for locking said second electrical connector within said second handle portion with a second predetermined and polarized orientation with respect thereto so that only limited relative rotational and/or longitudinal motion therebetween is possible;
    (e) third means for locking said second electrical connector within said second handle portion as aforedescribed;
    (f) fastening means penetrating both of said first and second handle portions and said first electrical connector when said first and second handle portions are positioned in limited and polarized telescoping engagement for retaining said first and second handle portions in a predetermined relationship; and
    (g) a sleeve associated with said first electrical connector for providing a passageway for said fastening means and for concomitantly preventing electrical conductors associated with said first electrical connector from interfering with the placement of said fastening means, said sleeve comprising a separate part, and said sleeve including spring wing members for locking said sleeve in association with said first electrical connector.

2. A longitudinal hollow handle for an electrical appliance and comprising in cooperative combination:
   (a) first and second handle portions configured for limited and polarized telescoping engagement;
   (b) first and second electrical connectors associated with and interior of said first and second handle portions, respectively, for completing an electrical connection therebetween when said first and second handle portions are positioned in said polarized telescoping engagement;
   (c) first means for locking siad first electrical connector within said first handle portion with a first predetermined and polarized orientation with respect thereto so that only limited relative rotational and/or longitudinal motion therebetween is possible;
   (d) second means for locking said second electrical connector within said second handle portion with a second predetermined and polarized orientation with respect thereto so that only limited relative rotational and/or longitudinal motion therebetween is possible;
   (e) third means for locking said second electrical connector within said second handle portion as aforedescribed;
   (f) fastening means penetrating both of said first and second handle portions and said first electrical connector when said first and second handle portions are positioned in limited and polarized telescoping engagement for retaining said first and second handle portions in a predetermined relationship;
   (g) said third locking means comprising a spring wing member having a projection which projects through a perforation in said second handle portion, and said projection on said spring wing member which projects through said perforation in said second handle portion serving to limit the longitudinal motion in one direction, of a compression spring surrounding the exterior of said second handle portion.

3. The combination as set forth in claim 2 wherein said compression spring acts on the projection member projecting through said perforation for biasing said second electrical connector towards one limit of its limited longitudinal motion.

* * * * *